Patented Jan. 22, 1946

2,393,468

UNITED STATES PATENT OFFICE 2,393,468

PROCESS FOR SEPARATION OF METALLIC VALUES

Albert Hanak, Elkins Park, Pa.

No Drawing. Application October 23, 1942,
Serial No. 463,077

3 Claims. (Cl. 75—97)

This invention relates to a process for the separation of tin, antimony and arsenic from copper, nickel and iron, and in particular is directed to the accomplishment thereof by effecting a solution of the tin, antimony and arsenical values.

In the smelting of ores and metalliferous byproducts as well as in the purification of metals and alloys containing the above named elements, some very complex residual alloys are obtained. Generally they are called speisses or glance metals, but sometimes the name "matte" is applied to them, although they are not sulfides. Chemically they are stannides, antimonides and arsenides of copper, nickel and iron. In the smelting and refining of secondary nonferrous alloys, byproducts and residues, the resultant speisses as a rule generally contain all of the above six elements in varying amounts. However, the principal constituents of these speisses, hardheads and the like, are copper, tin and antimony, while nickel, iron and arsenic are present only in smaller percentages. A striking characteristic of these alloys is their extreme brittleness. For this reason they find but little industrial application, and therefore have a commercial value which is far below the aggregate of the monetary values of their constituent metals. Since their aggregate value is quite large, many efforts have been directed to separate the constituents of the speisses, and obtain a financial return commensurate with such value. Of the several processes known, proposed or patented aiming at the recovery of these metallic values up to the present time, all of them have yielded very incomplete results and, as a rule, only at very great cost.

The processes now being practiced fall into three groups. In one, relying upon the greater affinity of sulfur toward copper and iron than toward tin, antimony and arsenic, the metals are fused with sulfur or sulfurizing agents. As a variant from the foregoing in this group, the speiss is fused with sulfur containing alkalies under strongly reducing conditions to form sulfides of the copper and iron and alkali-sulfo compounds of tin, antimony and arsenic, which latter are then dissolved in water. Both of the foregoing processes yield incomplete results, because, if nickel is present as stannide or antimonide, it does not unite with the sulfur and also because the molten sulfides of copper and iron invariably retain large percentages of tin and antimony.

The second group of known processes utilizes silicon to combine with the copper, nickel and iron and then the freed tin, antimony and arsenic are dissolved in lead. Aside from the exorbitant cost of such a process, the results are very incomplete, because the silicides of copper, nickel and iron retain very substantial amounts of tin and antimony as well as the added lead.

The third group of the processes depends on: (a) the solubility of the oxides of copper, nickel and iron in dilute mineral acids such as sulfuric acid for instance, and (b) the relative insolubility of the oxides of tin and antimony in the acid. Such a process also yields very incomplete results, because in commercial operations, it is almost impossible completely to oxidize the speisses and, as a result, the lixiviated oxides always retain large amounts of copper and nickel.

The present invention is a great improvement over the existing art, because it affords a substantially complete separation of tin, antimony and arsenic from copper, nickel and iron in any combination as contained in the speisses.

It is, accordingly, an object of the invention to separate metals such as tin, antimony and arsenic from copper, nickel and iron in any combination, and particularly as contained in the speisses.

Another object of the invention is to effect a separation and recovery of these metals by an economical procedure and through the use of the simplest equipment.

Another object of the invention is to effect a substantially complete separation of metals such as tin, antimony and arsenic from metals such as copper, nickel and iron in any combination, and particularly as they are contained in the speisses.

The essence of the invention which renders the foregoing objects possible of accomplishment resides in readily effecting:

(1) A complete sulfurization of the metals such as are contained in a finely powdered speiss with molten sulfur in a strong solution of caustic alkali.

(2) Separating the insoluble sulfides of copper, iron and nickel from the tin, antimony and arsenic which pass into solution.

Further objects and a fuller understanding of the invention will be gathered upon reading the following general and detailed description.

Generally, a finely ground speiss, hardhead or the like, mixed with the requisite amount of sulfur is treated with a strong aqueous solution of caustic alkali, such as caustic soda, heated above the melting point of sulfur. All the constituents of the speiss are completely sulfurized. The temperature may range from about 115 degrees C. to about 135 degrees C. The sulfides of copper, nickel and iron are insoluble in caustic soda, while those of tin, antimony and arsenic are very soluble. The strong solution is diluted with water and the soluble and insoluble constituents separated from each other by filtration. The sulfides of copper, nickel and iron can then be treated by any of the known processes and the copper and nickel recovered separately. The tin and antimony are recovered from the solution, preferably by electrolysis or by precipitation. Only the simplest of mechanical equipment is necessary for carrying out the process and cheap and easily obtained reagents are used, which can be regenerated. There are no losses involved in the process such as those which inevitably result in smelting and roasting operations. The reaction is instantaneous and, as a consequence, very large quantities of materials can be treated in comparatively small equipment. Furthermore, and in contrast with the former processes, all the valuable constituents are obtained in pure form.

As a practical example of my process 5000 lbs. of speiss of the following composition:

|   | Per cent |
|---|---|
| Cu | 43.40 |
| Sn | 28.20 |
| Sb | 14.70 |
| Pb | 3.80 |
| Ni | 3.70 |
| As | .90 |
| Fe | 2.50 |
| S | 1.20 |
| Undetermined | 1.60 |
|   | 100.00 | was ground to 200 mesh fineness and mixed with 2000 lbs. sulfur. A 50 per cent. solution containing 3000 lbs. of caustic soda was heated to 130 degrees C. in a cast iron kettle provided with a stirrer and the speiss-sulfur mixture was fed in with the stirrer in motion. Stirring was continued for 30 min. Then a wash solution from a previous batch was run in until a volume of 3000 gals. obtained. The reaction mixture then was passed through a filter press and the solids washed with hot water until the washwater contained no more soluble sulfides, the wash solution going to a separate storage to be used for dilution as indicated.

There was obtained 4450 lbs. of filterpress mud containing 21 per cent. moisture, or 3516 lbs. of dry sulfides of the following composition:

|   | Per cent |
|---|---|
| Cu | 61.3 |
| Sn | .4 |
| Sb | .4 |
| Pb | 5.3 |
| Ni | 5.3 |
| As | Trace |
| Fe | 4.7 |
| S | 22.0 |

(This material was transferred to the copper smelter.)

The solution containing the sulfo-compounds of tin-antimony and arsenic was circulated through an absorption tower, into which the roaster gases containing the $SO_2$ from a previous batch of tin-antimony sulfides was introduced and the tin, antimony and arsenic were precipitated as sulfides. The sulfides were subsequently roasted at a moderate temperature in a reverberatory type roasting furnace and there were obtained 2800 lbs. of oxides of the following analysis:

|   | Per cent |
|---|---|
| Sn | 49.7 |
| Sb | 25.5 |
| As | .3 |
| S | 1.3 |
| $O_2$ | 23.4 |
| Cu | Trace |
| Ni | Trace |
| Pb | .10 |
| Fe | .40 |

As mentioned in the foregoing, the tin and antimony can be obtained separately by electrolyzing the solution containing the sulfo compounds and that such a procedure is preferred.

The process as described can be applied to the separation and recovery of the constituents of many types of metallurgical residues containing copper, tin and antimony, wherein the metals are present primarily in their elemental form. The process also may be used when the foregoing residues contain considerable quantities of oxides and sulfides of the metals. The only prerequistite in respect to such materials is that they should be amendable to fine comminution.

As to the sulfurization, it is important to use sufficient sulfur in order to effect the complete conversion of the tin, antimony and arsenic into their soluble sulfo compounds. Accordingly, an excess of sulfur may be used. Furthermore, the concentration of the caustic alkali may be varied, but its temperature should be sufficiently high to melt the sulfur so that the tin, antimony and arsenical values pass as completely as possible into solution.

Finally, it is to be noted that this process is highly effective in separating other metals which form soluble compounds under the conditions described. Those metals pass into solution with the tin, antimony and arsenic, while metals which form sulfides or other compounds that are insoluble, such as the lead in the foregoing example, separate out with the copper, iron and nickel sulfides.

I claim:

1. Process of the class described which comprises: heating an aqueous solution of caustic soda to a temperature of approximately 115° C. to 135° C.; continuously stirring the solution while feeding it with a mixture of sulfur and a finely powdered speiss until the metallic values thereof which solubilize during the reaction have been dissolved; diluting the reaction mass with water; and separating the insoluble residue.

2. Process as claimed in claim 1 wherein the diluent is a wash water obtained from a previous batch of an insoluble residue produced by this process.

3. Process of the class described which comprises: heating an aqueous solution of caustic soda to a temperature of approximately 115° C. to 135° C.; continuously stirring the solution while feeding it with a mixture of sulfur and a finely powdered alloy comprising metallic values selected from the group consisting of tin, antimony and arsenic, and metallic values selected from the group consisting of copper, iron and nickel, until the first mentioned metallic values have been dissolved; and separating the insoluble residue.

ALBERT HANAK.